United States Patent [19]

Deming

[11] 4,015,109
[45] Mar. 29, 1977

[54] RESET ODOMETER MECHANISM

[75] Inventor: Kenneth R. Deming, Flint, Mich.

[73] Assignee: General Motors Corporation, Detroit, Mich.

[22] Filed: Sept. 19, 1975

[21] Appl. No.: 614,976

[52] U.S. Cl. .......................... 235/96; 235/117 R; 235/133 R; 235/144 PN
[51] Int. Cl.² ....................................... G01C 22/00
[58] Field of Search ............ 235/95, 96, 103, 117, 235/133 R, 144 PN, 144 SS

[56] References Cited

UNITED STATES PATENTS

| | | | |
|---|---|---|---|
| 3,516,603 | 6/1970 | Hachtel | 235/95 R |
| 3,580,497 | 5/1971 | Powell | 235/96 R |
| 3,667,671 | 6/1972 | Hachtel | 235/96 R |
| 3,918,634 | 11/1975 | Muller | 235/117 R |

*Primary Examiner*—L. T. Hix
*Assistant Examiner*—Vit W. Miska
*Attorney, Agent, or Firm*—K. H. MacLean, Jr.

[57] ABSTRACT

An improved "reset" type odometer assembly having counting wheels rotatably supported on a shaft and interconnected by pinion gears therebetween for sequential counting as mileage progresses. A gear wheel between each of the counting wheels is engaged on its right side by a pinion gear which moves with each revolution of the counting wheel located to its right. In turn the gear wheel engages an outer pawl on a molded ratchet spring to cause corresponding rotation of the leftwardly positioned counting wheel. The ratchet spring also has an inner pawl which is engaged by a groove in the shaft when rotated to cause the ratchet spring and counting wheel to rotate during a reset mode of operation. During resetting, the gear wheel and pinion gears are stationary and the outer pawl moves between circumferentially spaced detents in the gear wheel. The ratchet spring itself is formed with inner and outer hoop portions and is of a relatively flexible plastic material to permit movement between the hoop portions and the two pawls.

3 Claims, 4 Drawing Figures

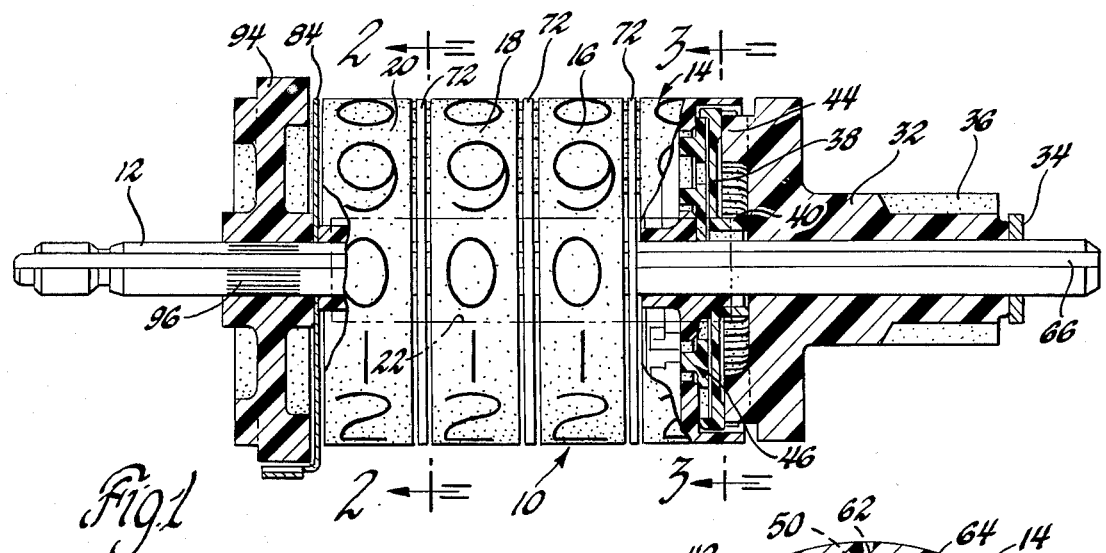
Fig. 1
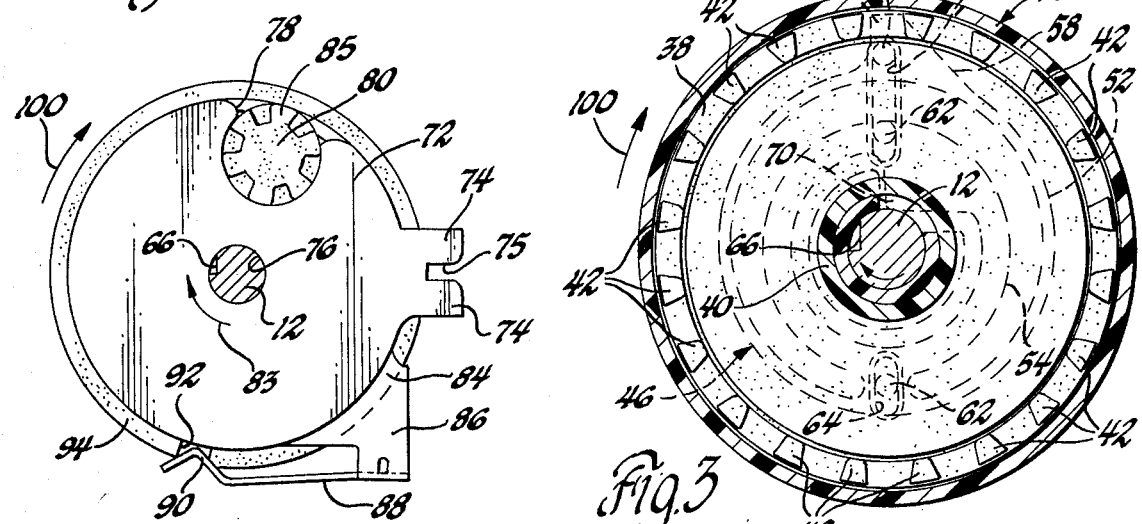
Fig. 2
Fig. 3
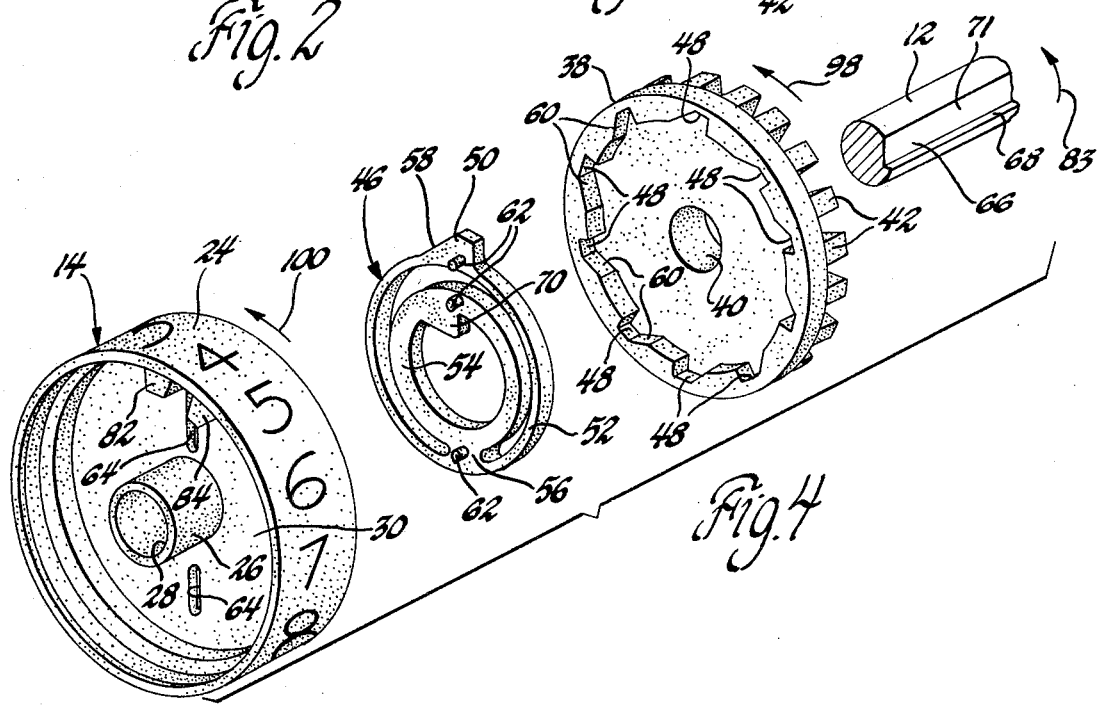
Fig. 4

RESET ODOMETER MECHANISM

This application relates to an improved "trip" type odometer assembly including a simple motion transfer mechanism which allows movement of adjacent counting wheels during a reset mode of operation.

The improved odometer assembly employs many common parts with the odometer assembly which forms the subject of U.S. Pat. No. 2,117,024 to Helgeby. In the Helgeby odometer, a plurality of counting wheels are rotatably mounted on a shaft. The wheels are interconnected for sequential counting operation during movement of a vehicle by pinion gears supported by pinion gear carriers located between the wheels. The rightward ends of the pinion gears are engaged by tooth means on the adjacent lower order counting wheel to cause rotation of the pinion gear with each full revolution of the lower order wheel. The leftward end of the pinion gear engages continuously spaced teeth formed around the circumference of the adjacent higher order counting wheel. Rotation of the pinion gear causes the higher order counting wheel to advance one tenth of a revolution or one numerical division on the circumference.

During a reset mode of operation in which all the counting wheels are rotated together by turning the shaft, the pinion gears must somehow be disengaged from the gears on the counting wheels to permit the counting wheels to be rotated simultaneously. In the Helgeby odometer this is accomplished by permitting radial movement of the pinion gears in elongated slots of the pinion carriers against a leaf spring which yields to permit the pinion gear to move inward and out of engagement with the teeth on the counting wheels.

The subject odometer assembly utilizes a much simpler pinion gear support. The improved assembly permits the use of "fixed center" pinion carriers which are commonly used in nonresettable odometers which cannot be reset without difficulty or great patience. The fixed center pinion carrier has a slot to support a pinion gear but the length of the slot supports the pinion gear a fixed distance from the center of the pinion carrier and in constant engagement with the counting wheels. The elimination of the leaf spring and the resultant constant engagement between the pinion gears and the counting wheels is permitted because the subject odometer assembly utilizes unique motion transfer mechanism between the counting wheels. During a reset mode of operation, the counting wheels may be rotated simultaneously without binding the pinion gears.

The subject odometer assembly also has desirable features in comparison to the specific trip type odometer mechanism presently available in General Motors' automobiles. In this odometer mechanism an arcuate wire spring is utilized between adjacent counting wheels, the outer end of which contacts the counting wheel, the inner end of which engages the groove of the odometer shaft. When the shaft is rotated during the reset mode of operation, the wire spring interconnects the shaft and the counting wheels. A problem with the use of the aforedescribed wire spring which applies equally as well as to the previously discussed leaf spring is the difficulty encountered in assembling these parts. The leaf springs fit over leg portions located on the pinion gear carrier on either side of the slot in which the pinion gear is supported. The insertion thereon is in a direction parallel to the plane of the carrier which is undesirable for automated assembly in which it is desirable to combine all parts in an axial stacking manner. Thus the insertion of the leaf spring must occur in a subassembly apart from final assembly. Similarly, the wire spring of the present production odometer must be inserted by the use of tweezers or the like. Both of these costly production methods are eliminated by the improved odometer assembly which may be easily assembled by automatic machinery.

The subject odometer utilizes unique motion transfer components between the counting wheels to permit simultaneous rotation of the wheels with respect to the normal mileage drive mechanism. The components include a gear wheel positioned between each counting wheel and supported for rotation about the odometer shaft. The gear wheel has a twenty-tooth configuration on its rightward side adjacent the lower order counting wheel which is engaged by the left end of the pinion gear. The leftward side of the gear wheel which is adjacent the next higher order counting wheel has formed therein ten circumferentially spaced detents which are adapted to be engaged by one pawl of a molded ratchet spring supported around the odometer shaft. The ratchet spring has substantially concentric hoop portions made of resilient plastic material, either of which may flex during operation of the odometer. The aforesaid pawl engages the detents of the gear wheel for driving motion during a normal counting mode of operation. However, when the ratchet spring is rotated by engagement between the shaft and the ratchet spring during the reset mode the outer hoop portion is flexed radially inward to permit the pawl to move between adjacent detents and thus permitting the gear wheel to remain stationary while the ratchet spring and counting wheels rotate.

The inner of the hoop portions of the ratchet spring has an inwardly projecting second pawl which engages a groove in the odometer shaft to cause simultaneous rotation of the ratchet spring and the shaft during reset.

Resetting the aforedescribed odometer with the unique transfer mechanism may be accomplished with only a single rotation of the odometer shaft to achieve zero reset of all the counting wheels. This in contrast to the odometer described in the Helgeby patent in which it was necessary to rotate the shaft two complete rotations to insure zero alignment of the wheels. In the Helgeby device it is necessary for the pinion gear to slip with respect to the teeth on the counting wheel by inward movement of the leaf spring. It is possible in the Helgeby device that the pinion gear would slip only a single tooth of the twenty tooth figure wheel and an additional turn was required to insure that no wheel would be left in a half numbered position.

A further improvement in the subject odometer assembly results from the use of plastic for the molded ratchet spring. With most plastics, the coefficient of friction between the inner pawl and the odometer shaft is less than between the steel wire and the odometer shaft in Helgeby. Resultantly less frictional drag in the assembly reduces running torque and decreases wear.

Further advantages of the subject resettable odometer assembly will be more readily apparent from the following detailed description, reference being had to the accompanying drawings in which a preferred embodiment of the assembly is illustrated.

IN THE DRAWINGS:

FIG. 1 is a view of the odometer assembly partially broken away to reveal interior portions;

FIG. 2 is a sectioned view taken along section line 2—2 in FIG. 1 and looking in the direction of the arrows;

FIG. 3 is a sectioned view taken along section line 3—3 in FIG. 1 and looking in the directions of the arrows;

FIG. 4 is a perspective view of a portion of the assembly with the motion transfer mechanism between counting wheels separated for greater clarity.

In the drawings, an improved "trip type" resettable odometer assembly 10 is illustrated including a shaft 12 adapted to be supported at both ends by a frame (not shown). A plurality of counting wheels 14, 16, 18 and 20 are mounted upon shaft 12 and rotatable thereon. The wheels 14, 16, 18, 20 have circumferentially spaced numerical indications from 1 to 10 which are visible through a window 22 (shown by dotted lines) in an instrument cover. The numerals indicate a mileage interval between resettings. The counting wheels 14–20 are identical and include an outer ring portion 24 on which the aforementioned numerals are imprinted. A hub portion 26 has a bore 28 to accept the shaft 12. The hub portion 26 and ring portion 24 are integrally connected by a midportion 30.

Referring specifically to FIG. 1, a drive member 32 is mounted upon one end of shaft 12 and is axially retained thereon by an end play washer 34 adapted to engage a portion of the aforesaid frame assembly. The drive member 32 also includes gear teeth 36 thereabout adapted to be engaged by another gear operably connected to the drive mechanism of a vehicle so that the member 32 rotates at a rate corresponding to the speed and, therefore, the distance through which a vehicle travels. Member 32 and shaft 12 are loosely fitted so that relative rotation therebetween is permitted. As shown in FIGS. 1 and 4, a gear wheel 38 is supported by shaft 12 adjacent the rightward side of wheel 14. The gear wheel 38 includes a central hub portion 40 and has twenty gear teeth 42 extending from the peripheral edge of its right side. The teeth 42 are engaged by similarly configured gear teeth 44 on the member 32. Thus, when the member 32 is rotated corresponding to movement of the vehicle, the gear wheel 38 is also rotated about shaft 12.

During a counting mode of operation, rotation of the gear wheel 38 causes corresponding rotation of a molded ratchet spring member 46. Specifically, the gear wheel 38 has ten recessed socket portions or detents 48 formed therein and circumferentially arranged about the axis of the gear wheel. The socket portions 48 are engaged by a radially outwardly extending pawl 50 on the ratchet spring 46. The ratchet spring 46 is molded of relatively rigid yet flexible plastic material in a configuration including an outer hoop portion 52 and an inner hoop portion 54. The hoop portions are interconnected integrally by a bridge portion 56. The pawl 50 extends outward from the outer hoop portion 52 and has a surface 58 which engages the surface 60 of detents 48. Surfaces 58 and 60 are inclined with respect to the tangent of the gear wheel 38 so that when wheel 38 is held from turning pawl 50 may jump between adjacent detents 48 with corresponding flexing of hoop 52 with respect to the axis of shaft 12. Specifically, the portion adjacent pawl 50 moves downward and the side portions move outward. This movement of pawl 50 between detents 48 of the gear wheel occurs only during a resetting operation when pinion gears hold the gear wheel stationary. During a counting operation, the gear wheel 38 and ratchet spring 46 rotate together about shaft 12, and pawl 50 remains in engagement with one of the detents 38. Also, the counting wheel 14 shown to the left of the ratchet spring in FIGS. 1, 4 is rotated by a connection between the ratchet spring 46 and the counting wheel formed by the engagement of pins 62 on spring 46 and channels 64 in the spoke portion 30 of the wheel 14. During flexing of either the hoops 52 or 54, the pins 62 travel radially in channels 64.

Shaft 12 has a groove 66 therein forming a shoulder 68 thereon adapted to engage a second pawl 70 of the ratchet spring 46 as shaft 12 is rotated in the direction shown by arrow 83 in FIG. 4. Pawl 70 extends radially inward from the hoop portion 54. During normal counting operation, the gear wheel 38, ratchet spring 46 and counting wheel 14 rotate together about shaft 12, and the pawl 70 slides over the surface of shaft 12 and past shoulder 68, subsequently moving across the gently inclined portion 71 of the groove 66. The resultant radial movements of the pawl 70 and hoop 54 with respect to shaft 12 are accommodated by flexing of the hoop portions 54, 52.

A similar transfer mechanism, including a pinion gear as taught in the Helgeby patent, a gear wheel, and a ratchet spring is utilized between each of the counting wheels 16, 18 and 20. Because the transfer mechanism is the same, only wheel 14 and the mechanism to the right are shown in FIG. 4. In more detail, a pinion gear carrier plate 72 is illustrated in FIG. 2 which has outwardly extending projections 74 forming a notch 75 adapted to engage a frame part of the odometer assembly (not shown). The carrier plate 72 has a centrally located opening 76 through which shaft 12 extends and is free to rotate. Also, a radially extending channel or slot 78 is formed in the plate 72 to support a pinion gear member 80 a fixed distance from the axis of shaft 12. When the lower order figure counting wheel (to the right in FIG. 1) moves through a full rotation, two teeth 82, 84 on the leftward side of the counting wheel in FIG. 4 engage gear teeth 85 (right end) of the pinion gear 80, causing it to partially rotate one-third of a revolution. The other end (left end in FIG. 1) of the pinion gear 80 also has a toothed configuration adapted to engage the twenty-tooth gear wheel 38 located to the right of the counting wheel 14.

For more specific details of the configuration of pinion gear 80 and carrier plate 72, reference is made to U.S. Pat. No. 3,137,444 to Harada which issued June 16, 1964, and is assigned to the General Motors Corporation.

During a reset mode of operation, shaft 12 is rotated in a direction as shown by arrow 83 in FIGS. 2–4. Normally during a counting mode of operation, the shaft 12 is yieldably held in a nonrotating position by a stop plate 84 to the left of wheel 20. Stop plate 84 is similar to the carrier plates 72 and has extensions which engage the frame just like those identified by the numeral 74 in FIG. 2. The plate 84, however, has a second extended portion 86 which supports one end of a cantilevered leaf spring 88. The free end of spring 88 is bent radially inwardly at point 90 so that it may engage groove 92 formed in end member 94 which is staked to shaft 12 by knurled portions 96. The portion of shaft 12 adjacent member 94 is adapted to extend through an opening of the previously mentioned frame assembly (not shown) which supports the odometer assembly. The left end portion of shaft 12 is engaged by a reset transfer mechanism (not shown) which may take the form of a knob or also include a gear and shaft assembly. The reset mechanism is manually turned so as to cause the shaft 12 to rotate and disengage portion 90 of leaf spring 88 from groove or notch 92.

During the normal counting operation, shaft 12 remains stationary and the drive member 32 is rotated in correspondence with vehicle movement. The engagement between gears 42, 44 rotates the gear wheel 38 in a counterclockwise direction, indicated by numeral 98 in FIG. 4. The rotation of gear wheel 38 and engagement of surfaces 58 and 60 on the ratchet spring 46 and gear wheel 38 produce rotative movement of the counting wheel 14, as indicated by arrow 100 in FIGS. 2, 3 and 4. As previously explained, when the second pawl 70 passes over groove portion 66 of shaft 12, there may be flexing of either hoop portion 52 or 54 which will not affect the normal counting operation.

During the reset mode of operation, the shaft 12 is rotated in the direction shown by numeral 83 in FIGS. 2, 3 and 4 which engages surface 68 and pawl 70 to cause rotation of the ratchet spring 46 in the direction indicated by the numeral 83. rotation of spring 46 causes the counting wheels to rotate therewith. During this operation, the gear wheels 38 are held stationary and pawl 50 moves between adjacent detents 48 in the gear wheel accomplished by radially inward flexing of the upper portion of hoop 52 and corresponding outward deflections of the side portions of the hoop 52. Simultaneously, pins 62 move within channels 64 while simultaneously causing rotation of the figure wheels.

Although the embodiment described above and illustrated in the drawings is a preferred embodiment, modifications may be made to the structure of the odometer assembly without falling outside of the scope of the following claims which define the invention.

What is claimed is:

1. A rotary motion transfer mechanism for use in an odometer assembly of the type including a shaft on which are supported for rotation a number of counting wheels with pinion gears therebetween, one end portion of which is engaged by means on the adjacent lower order counting wheel located to the right of the pinion gear to produce rotation of the pinion gear with each revolution of the lower order counting wheel, the transfer mechanism comprising: a gear wheel mounted for rotation on the shaft and located to the right of each counting wheel with a circumferentially continuous gear tooth configuration on its righthand side for receiving a rotative input from the pinion gear to its right; said gear wheel having a number of detents formed on its leftward side; a ratchet spring mounted for rotation about the shaft and located between each counting wheel and gear wheel; said ratchet spring having inner and outer hoop portions of resilient material connected together by a bridge portion; means on the outer hoop of said ratchet spring for engaging one of said gear wheel detents to form a drive connection therebetween for rotation together during a counting mode of operation; means between said inner hoop portion and the shaft to permit simultaneous rotation together during a reset mode of operation whereby said gear wheel remains stationary and said outer hoop means slips from one detent to another adjacent detent made possible by simultaneous inward and outward flexing of said outer hoop portion.

2. A rotary motion transfer mechanism for use in an odometer assembly of the type including a shaft on which are supported for rotation a number of counting wheels with pinion gears therebetween, one end portion of which is engaged by means on the adjacent lower order counting wheel located to the right of the pinion gear to produce rotation of the pinion gear with each revolution of the lower order counting wheel, the transfer mechanism comprising: a gear wheel mounted for rotation on the shaft and located to the right of each counting wheel with a circumferentially continuous gear tooth configuration on its righthand side for receiving a rotative input from the pinion gear to its right; said gear wheel having a number of detents formed on its leftward side; a ratchet spring mounted for rotation about the shaft and located between each counting wheel and gear wheel; said ratchet spring having inner and outer hoop portions of resilient material connected together by a bridge portion; a first pawl extending outward from said outer hoop portion into engagement with one of said gear wheel detents to form a drive connection therebetween for rotation together during a counting mode of operation; said gear wheel detents and said first pawl having engaging surfaces inclined with respect to the tangential direction of the gear wheel to permit slippage of said first pawl between adjacent detents; a second pawl extending inward from said inner hoop portion engaged by means on the shaft when rotated to cause said ratchet spring to rotate relative to said gear wheel with said corresponding slippage of said first pawl between said detents made possible by simultaneous inward flexing of the outer hoop portion adjacent the first pawl and outward flexing of the sides of said outer hoop portion; means between said ratchet springs and said counting wheels connecting them for rotation together.

3. A rotary motion transfer mechanism for use in an odometer assembly of the type including a shaft on which are supported for rotation a number of counting wheels with pinion gears therebetween, one end portion of which is engaged by dual tooth means on the adjacent lower order counting wheel located to the right of the pinion gear to produce rotation of the pinion gear with each revolution of the lower order counting wheel, the transfer mechanism comprising: a gear wheel mounted for rotation on the shaft and located to the right of each counting wheel with a circumferentially continuous twenty gear tooth configuration on its rightward side for receiving a rotative input causing a one tenth revolution from rotation of the pinion gear to the right of the gear wheel; said gear wheel having a number of detents formed on its leftward side; a ratchet spring mounted for rotation about the shaft and located between each counting wheel and gear wheel; said ratchet spring being molded by a resilient plastic material and having inner and outer hoop portions connected together by a narrow bridge portion; a first pawl extending outward from said outer hoop portion at a location opposite said bridge portion and engaging one of said gear wheel detents to form a drive connection therebetween for rotation together during a counting mode of operation; a second pawl extending inward from said inner hoop portion engaged by shoulder means on the shaft when rotated during a reset mode of operation thereby causing said ratchet spring to rotate relative to said gear wheel with corresponding slippage of said first pawl between said detents made possible by inward flexing of said outer hoop portion adjacent the first pawl and outward flexing of the sides of said outer hoop portion; each counting wheel having at least one radially extending slot therein; at least one pin projecting from the side of said ratchet spring into said slot in said counting wheel connecting them for rotation together during counting and reset modes of operation during which said pin is free to move radially in said slot as said hoop portions flex.

* * * * *